(12) United States Patent
Belmonte et al.

(10) Patent No.: US 7,805,125 B2
(45) Date of Patent: Sep. 28, 2010

(54) METHOD AND SYSTEM OF MANAGING EMERGENCY ALARMS IN A WIRELESS COMMUNICATION SYSTEM

(75) Inventors: John P. Belmonte, Elk Grove Village, IL (US); David G. Wiatrowski, Woodstock, IL (US)

(73) Assignee: Motorola, Inc., Schaumburg, IL (US)

( * ) Notice: Subject to any disclaimer, the term of this patent is extended or adjusted under 35 U.S.C. 154(b) by 886 days.

(21) Appl. No.: 11/364,323

(22) Filed: Feb. 28, 2006

(65) Prior Publication Data

US 2007/0201391 A1  Aug. 30, 2007

(51) Int. Cl.
*H04M 11/04* (2006.01)
(52) U.S. Cl. .................... 455/404.1; 370/312
(58) Field of Classification Search ............. 455/404.1, 455/521, 404.2
See application file for complete search history.

(56) References Cited

U.S. PATENT DOCUMENTS

| 6,339,709 | B1 * | 1/2002 | Gladwin et al. | 455/115.1 |
| 6,836,211 | B2 * | 12/2004 | Joo | 340/539.1 |
| 2005/0233726 | A1 * | 10/2005 | Katsube et al. | 455/404.1 |

FOREIGN PATENT DOCUMENTS

| EP | 0522200 B1 | 5/1998 |
| WO | WO 2005072075 A2 * | 8/2005 |

OTHER PUBLICATIONS

PCT/US07/61222, PCT Search Report and Written Opinion, mailed Dec. 18, 2007, 8 pages.
PCT/US2007/061222, PCT Preliminary Report on Patentability, mailed Sep. 12, 2008, 8 pages.
Russian Patent Office, Russian Application No. 2008138567/09(049682), Office Action [translated], Oct. 19, 2009, 2 pages.
Australian Patent Office, Australian Application No. 2007220941, Office Action, Examiner's First Report, Dec. 17, 2009, 8 pages.

* cited by examiner

*Primary Examiner*—Rafael Pérez-Gutiérrez
*Assistant Examiner*—Marcos Batista
(74) *Attorney, Agent, or Firm*—Indira Saladi; Valerie M. Davis

(57) ABSTRACT

A system for managing emergency alarm messages in a wireless communications system is disclosed. A first subscriber is assigned an emergency alarm responder role to send an acknowledgement message and present information from a received emergency alarm message to a user of the first subscriber, when the first subscriber receives the emergency alarm message. A second subscriber is assigned an emergency alarm monitor role to present information from the received emergency alarm message to a user of the second subscriber.

15 Claims, 4 Drawing Sheets

METHOD AND SYSTEM OF MANAGING EMERGENCY ALARMS IN A WIRELESS COMMUNICATION SYSTEM

FIELD OF THE INVENTION

The present invention relates generally to wireless communications systems and more specifically to managing emergency alarms in a wireless communications system.

BACKGROUND OF THE INVENTION

A wireless communications system generally comprises a set of "subscribers," typically subscribers are the endpoints of a communication path, and a set of "base stations," typically stationary and the intermediaries by which a communication path to a subscriber may be established or maintained. In such a system, supporting equipment attached to the base stations, e.g. consoles, typically perform management of the communications in the wireless communications system. Since the supporting equipment is typically stationary, and always present in the wireless communications system, the supporting equipment typically handles the management of emergency messages. That is, the supporting equipment receives subscriber initiated emergency messages, handle the acknowledgements to the emergency messages, and process any resending of the emergency messages and/or acknowledgements.

However, there are instances where the wireless communications system does not have supporting equipment, e.g. where the wireless communications system is of low-cost and having the supporting equipment increases the cost of the wireless communications system. Further, there are instances where subscribers are in communication range of each other but out of range of the base stations attached to the supporting equipment. In both cases, where the subscribers communicate without supporting equipment, management of emergency messages does not exist because there is no supporting equipment to provide the management.

Without the supporting equipment to provide the management of emergency messages, a subscriber may not be certain that an emergency message was properly delivered to its destination, namely another subscriber because subscribers can roam out of range, may be turned off, or may otherwise be unavailable. As such, without management of emergency messages, providing confirmed delivery of an emergency message, that is confirming that a destination subscriber properly received an emergency message, is a challenge. For example, a first police officer in an emergency situation may initiate an emergency message to request backup, but without supporting equipment managing emergency messages, the emergency message is not guaranteed to be delivered to the destination, e.g. another police officer in a neighboring area that may be able to provide backup.

Accordingly, there exists a need for a new system and method for managing emergency alarms in a wireless communications system.

BRIEF DESCRIPTION OF THE FIGURES

An illustrative embodiment of the invention is now described, by way of example only, with reference to the accompanying figures in which.

Figure 1:
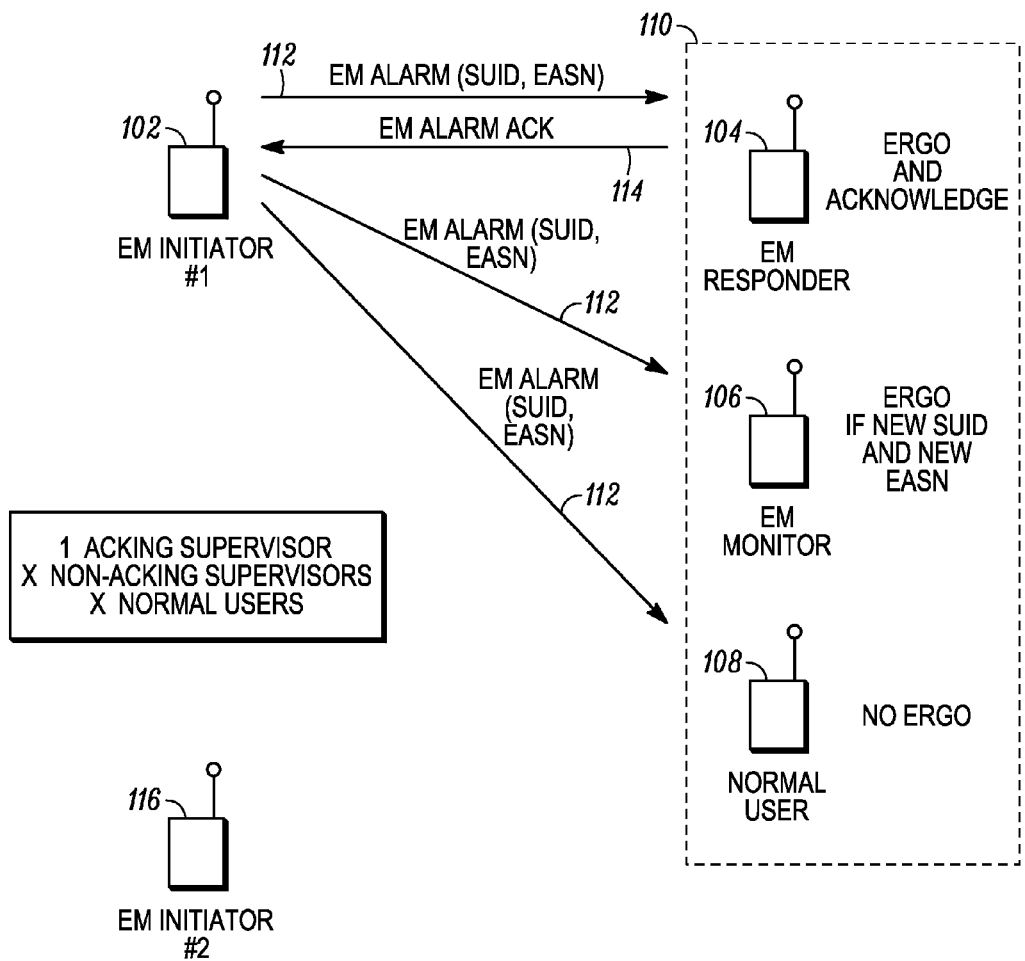
FIG. 1 is a block diagram of an example wireless communications system in accordance with an embodiment of the invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

DETAILED DESCRIPTION

Referring now to FIG. 1, there is shown an example wireless communications system 100 where management of emergency alarm messages is performed by the subscribers in the system 100. As such, the wireless communications system 100 has a plurality of subscribers, namely subscriber 102, subscriber 104, subscriber 106, subscriber 108, and subscriber 116. The subscribers 102, 104, 106, and 108 are communicating with each other on RF frequencies assigned to the wireless communications system 100.

In the wireless communications system 100, emergency alarm (EM) messages are sent between the subscribers to communicate emergency conditions. Specifically, an emergency alarm message is sent by a first subscriber (e.g. subscriber 102) called an "EM initiator" to a group of subscribers (e.g. subscribers 104, 106, and 108) in group 110. The definition of an emergency condition depends on the system operator of the wireless communications system 100, but it typically signifies an exceptional condition with more urgency for the users. In any case, an EM message is a non-voice signal that triggers an alert indication to a user of a subscriber and requires an acknowledgement message to be sent to the EM initiator. In the wireless communications system 100, the acknowledgement message is sent by at least one subscriber in the group 110 that is designated as an EM responder (e.g. subscriber 104).

As seen in FIG. 1, each subscriber in the wireless communications system 100 is assigned at least one of three roles where the roles are preprogrammed into the subscribers, e.g. via customer provisioning software. Each subscriber is an EM responder (e.g. subscriber 104), an EM monitor (e.g. subscriber 106), or a normal user (e.g. subscriber 108) that is oblivious to EM messages. An EM responder is a subscriber that sends an acknowledgement to a received EM message. The other subscribers, namely the EM monitors and normal users, do not send acknowledgements to received EM messages. Both EM responders and EM monitors are subscribers which process emergency alarms and present the information to a user of the subscriber. For example, either an EM responder or an EM monitor may present an audible alert as well as display the source ID of the received EM message to a user of the subscriber. In any case, a normal user ignores all EM messages.

As mentioned above, the role that a subscriber plays in the wireless communications system 100 may be preprogrammed via customer provisioning software. In one embodiment, a provisionable option termed "Emergency Alarm Indication" distinguishes normal users (e.g. subscriber 108) from subscribers that provide EM information to their users (e.g. subscribers 104, 106), where if the option is disabled, the subscriber is a normal user. In such an embodiment, a further option "Emergency Alarm Acknowledge" may be used to distinguish EM Responders from EM Monitors, where if the option is enabled, the subscriber will send an acknowledgement to a received EM message and function as an EM Responder.

Figure 2:
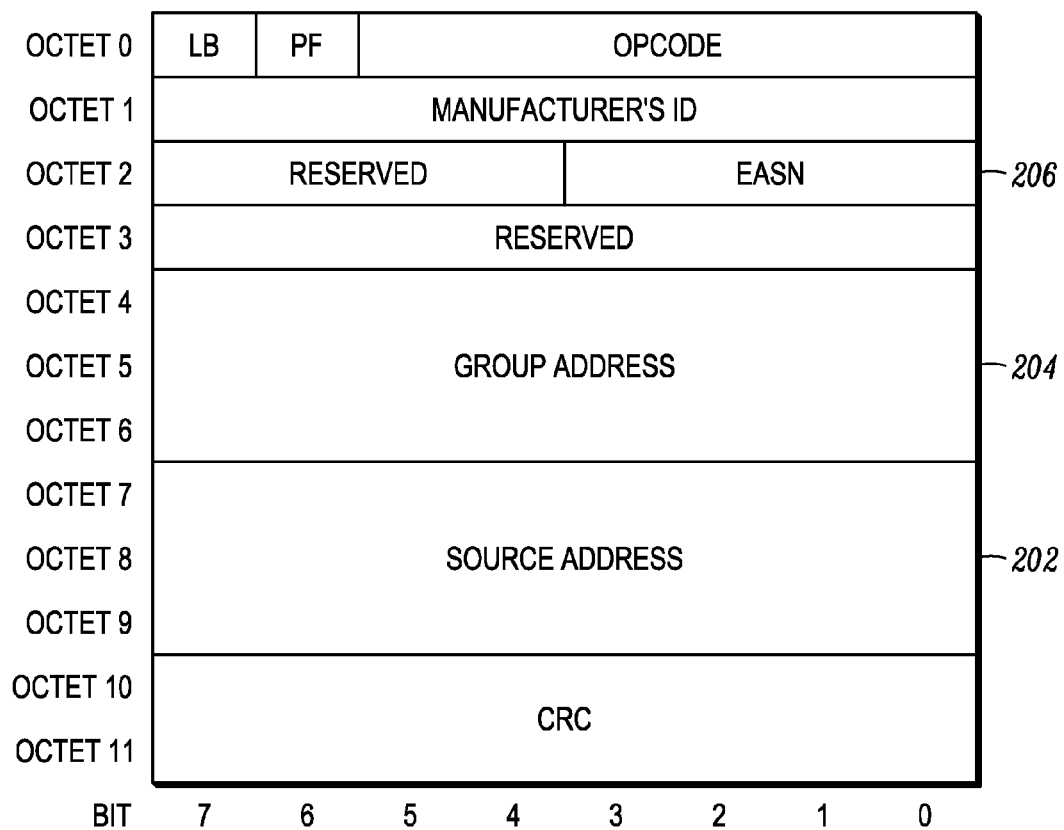
FIG. 2 is a block diagram of an example emergency alarm message in accordance with an embodiment of the invention.

In one embodiment, an EM message for use in the wireless communications system 100 comprises at least three fields, namely a field for an address of the EM initiator, a field for an address of the destination group, and a sequence number. A further example of the emergency alarm message is shown in FIG. 2 where the EM message 200 is 12 octets in length and has a source address field 202 for an address of the EM initiator, a group address field 204 for an address of the destination group, and an emergency alarm sequence number field 206. In one embodiment, the group address field identifies a talk group, where a talk group is known to one of ordinary skill in the art as a group of subscribers that share a single RF channel and are grouped and assigned a common talk group ID by a system operator of the wireless communications system 100.

Once an EM responder or EM monitor receives an EM message, the subscriber presents the EM message to a user. The presentation may comprise displaying the source address of the EM initiator to the user and may also comprise notifying the user via audible indication that an EM message has been received. In one embodiment, the subscriber (whether EM responder or EM monitor) is given an audible indication that an EM message has been received until the user clears the alarm, e.g. by selecting the entry in the list and pressing a sequence of buttons.

In any case, the subscriber (whether EM responder or EM monitor) maintains a list (e.g. a table) of received EM messages comprising a source address of the EM initiator (e.g. SUID), a sequence number of the EM message (e.g. EASN), and/or a field indicating whether the EM message was cleared or not. The list may be maintained in reverse time order, namely the most recent EM messages are listed at the top. An example such list is as follows where emergency alarm number 2 has been shown as cleared.

| Emergency Alarm Number | SUID | EASN | Clear |
|---|---|---|---|
| 1 | 001 | 2 | 0 |
| 2 | 002 | 2 | 1 |

In one embodiment, duplicate EM messages (as identified by the same sequence number for a single source address) are ignored by the subscriber (whether EM monitor or EM responder) and not presented to the user. Further, in one embodiment, the subscriber removes an entry from the list from the EM initiator when the EM initiator sends a new EM message thereby assuming that old EM messages are obsolete when new EM messages from the same subscriber are sent. In one embodiment, an EM message is determined to be new if the EM message has an EASN from a SUID that is different than an entry maintained in the above list. Further yet, in one embodiment, the list that the subscriber (whether EM responder or EM monitor) maintains is cleared on a power cycle of the subscriber.

As mentioned above and referring back to FIG. 1, an EM message (e.g. EM ALARM (SUID, EASN) 112) is sent by an EM initiator (e.g. 102) to a group of subscribers (e.g. 110) identified by a group address. Sending each EM message to a group of subscribers distributes the responsibility for managing EM messages across the wireless communications system 100. In one embodiment, in each group, only one of the subscribers is provisioned as an EM responder (e.g. 104), which (as mentioned above) has the responsibility for acknowledging received EM messages, e.g. by sending an EM ALARM ACK 114. The rest of the subscribers are either EM monitors or normal users. These subscribers do not send acknowledgements, e.g. 114, namely confirming delivery of received EM messages, because having many subscribers sending simultaneous transmissions may cause over-the-air interference which may cause the delivery of messages to become unreliable. Thus, only one subscriber per group is assigned to function as an EM responder.

In one embodiment, the acknowledgement sent in response to an EM message is termed an EM ALARM ACK 114 and comprises 12 octets with a field identifying that the message is an acknowledgement (e.g. via an opcode field), a source address of the EM responder and a destination address of the EM initiator.

In another embodiment, a group may be provisioned, e.g. accidentally and/or undesirably, with more than one EM responder. In such an embodiment, each EM responder is assigned a random launch time distribution, so that each EM responder waits a random time before sending an acknowledgement message. By requiring a random launch time, having more than one EM responder confirming delivery of EM messages does not cause unreliability of the wireless communications system 100.

Because subscribers may roam out of range, may be turned off, or may be roaming/scanning other channels other than the channel which the EM message is being sent on, the subscriber may not receive the EM message. If the subscriber is provisioned as an EM responder, it is responsible for sending an acknowledgement, but if it has not received the EM message, then it will not send the acknowledgment. Thus, in such a situation, if the EM initiator does not receive an acknowledgement, then the EM initiator will resend the EM message. The number of times that the EM initiator resends the EM message when the EM initiator has not received an acknowledgement is configurable, e.g. resending n times, where n is an integer, or resending an infinite number of times.

Figure 3:
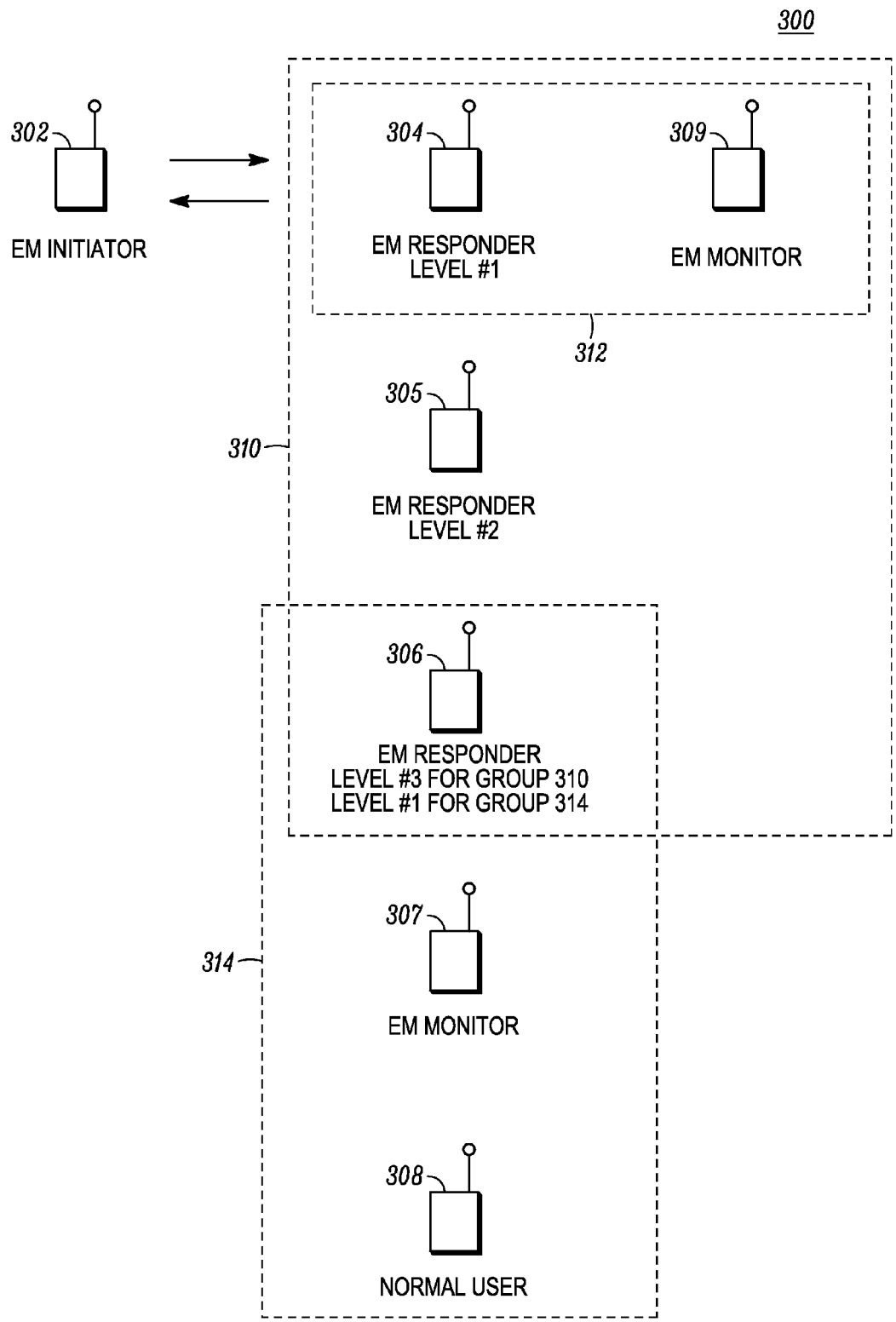
FIG. 3 is a block diagram of another example wireless communications system in accordance with an embodiment of the invention.

If the EM responder never responds, the EM initiator does not receive acknowledgement of the EM message. To handle such a problem, an alternate embodiment of the present invention is proposed where EM responders in the wireless communications system (e.g. 300) are tiered. Referring to FIG. 3, the EM responders 304, 305, 306 are identified as a $1^{st}$ level responder, a $2^{nd}$ level responder, and a $3^{rd}$ level responder. Even though the wireless communications system 300 is shown with three levels, there may be any number of levels and the number 3 is not meant to be a limitation on the scope of an embodiment of the present invention.

In operation, the EM initiator 302 sends an EM message which may comprise the group address, an EM responder level, and a retry number. The EM responder level designates a particular level in a hierarchy of EM responder levels in the wireless communications system 300 which are responsible for sending an acknowledgement upon receipt of an EM message. The retry number is used to specify the number of unacknowledged EM messages that have occurred to a single EM responder level before the EM initiator should move to another EM responder level. Both parameters, namely the EM responder level and retry number, are used to manage acknowledgements in the wireless communications system 300. When an acknowledgement is not received, the EM initiator 302 resends the EM message, incrementing the retry number included in the EM message. When a number of retries have been exhausted (with no acknowledgement received), the EM initiator attempts to reach the next level EM responder by incrementing the EM responder level included in the EA message and resetting the retry count back to 1. This process repeats up to a pre-designated maximum number of responder levels and a maximum number of retries (per responder level). In alternate embodiments, the EM responder level and/or the retry number may be preconfigured in the subscribers. As such, the information is not signaled via the EM message.

In any case, referring to FIG. 3 shown are three levels of EM responders in a first group, namely 310 and one level of EM responders in a second group, namely 314. In group 310, there is an EM level #1 312 comprising an EM responder 304 and EM monitor 309, where EM responder 304 has the responsibility to send acknowledgement messages to received EM messages, an EM level #2 comprising an EM responder 305 and an EM level #3 comprising an EM responder 306. As shown, EM responder 306 serves as a level 3 EM responder for group 310 but serves as a level 1 EM responder for group 314. In group 314, there is an EM level #1 comprising one EM responder, namely 306, an EM monitor 307, and a normal user 308. If the EM initiator 302 sends an EM message addressed to group 310, then the EM initiator has the knowledge that group 310 comprises 3 levels of EM responders (e.g. N=3) and the EM initiator may be provisioned for 3 retries per level (e.g. M=3). In such a case, the sequence of tries that the EM initiator 302 may carry out for sending an EM message addressed to group 310 is as follows (without receiving an acknowledgement to any sent EM message):

| EM responder level #1: | n = 1 | m = 1 |
| EM responder level #1: | n = 1 | m = 2 |
| EM responder level #1: | n = 1 | m = 3 |
| EM responder level #2: | n = 2 | m = 1 |
| EM responder level #2: | n = 2 | m = 2 |
| EM responder level #2: | n = 2 | m = 3 |
| EM responder level #3: | n = 3 | m = 1 |
| EM responder level #3: | n = 3 | m = 2 |
| EM responder level #3: | n = 3 | m = 3 |

If the EM initiator does not receive an acknowledgement, then it may repeat this sequence of retries. In any case, as an acknowledgement is received, the retry sequence terminates. In an alternate embodiment, the EM initiator may interleave tries to EM responder #1 304 between tries to the other responders, so that if EM responder #1 304 becomes available, then the EM initiator does not have to go through all the other responders before retrying EM responder #1 304.

In a further alternative, responders may be tiered according to the group that the responders are in. For example, in FIG. 3, EM Responder #1 304 may be a $1^{st}$ level responder for group 310 but EM Responder #3 306 may be provisioned as a $1^{st}$ level responder for group 312. In such a fashion, the responsibility for acknowledging EM messages is distributed across the wireless communications system 300.

Figure 4:
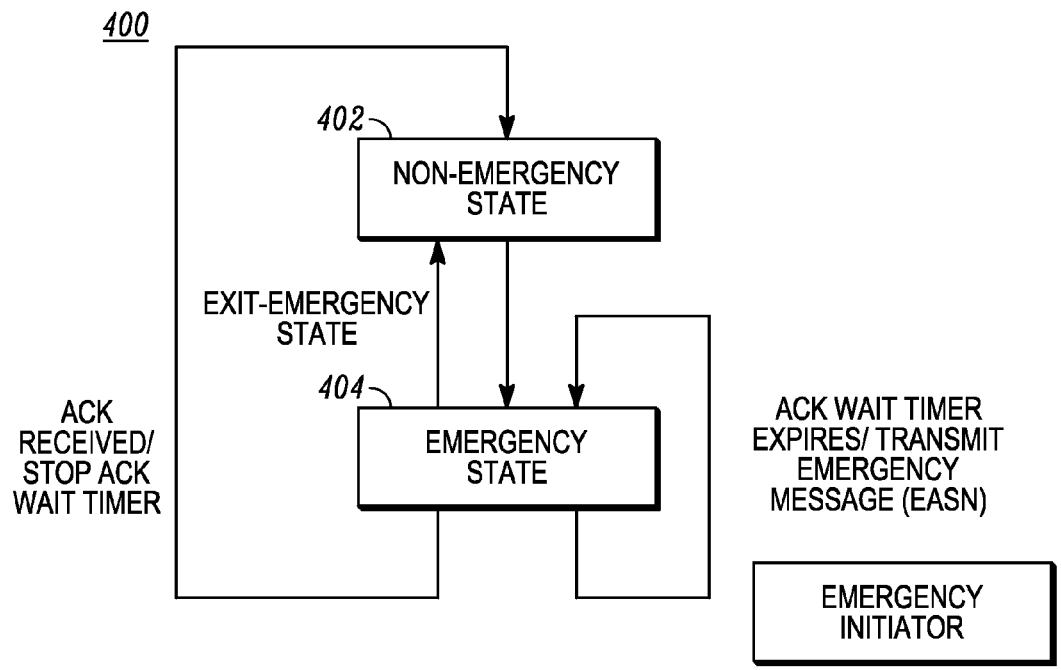
FIG. 4 is a state diagram of an example emergency initiator in accordance with an embodiment of the invention.

Regardless of whether there exists tiering of EM responders in the wireless communications system, EM responders have the responsibility of acknowledging received EM messages from an EM initiator. Referring to FIG. 4, shown is a state diagram of the operation of an EM initiator 400, e.g. EM initiator 102. An EM initiator normally is in a non emergency state 402 where the EM initiator 402 waits until an EM message is initiated by a user of the subscriber. As is known to one of ordinary skill in the art, an EM message may be initiated in a number of ways including by pressing an emergency button, by activating a footswitch, by activating a "Man-down" tilt switch, and by changing subscriber personalities. When an emergency alarm is initiated, the EM initiator transitions to an emergency state 404, where the EM initiator identifies a group to address the EM message to and increments a sequence number (e.g. a pre-stored variable) to create an EM message comprising at least a source address, a group address, and a sequence number. Then the EM initiator sends the created EM message to the group identified in the EM message and starts an acknowledgement timer.

In one embodiment, the sequence number is not reset or cleared when the subscriber is powered down or is otherwise non-functional. By keeping persistent the sequence number, a new EM message that is sent after a power cycle utilizes the next sequence number thereby identifying a new instance of an emergency condition. Further, in one embodiment, the acknowledgement timer is a preconfigured timer set to a maximum of the time to send the EM message plus the time to receive the acknowledgement in the wireless communications system.

Upon sending the EM message and starting the acknowledgment timer, the EM initiator waits for an acknowledgement. If an acknowledgement is received before the acknowledgement timer expires, the EM initiator returns to the non-emergency state 402. Otherwise, the EM initiator remains in the emergency state 404 to retransmit the EM message. The retransmitted EM message is a duplicate EM message and does not contain a new sequence number but retains the sequence number of the original EM message. In any case, if the acknowledgement timer expires and/or the user of the EM initiator cancels the emergency, then the EM initiator transitions to the non-emergency state 402.

Figure 5:
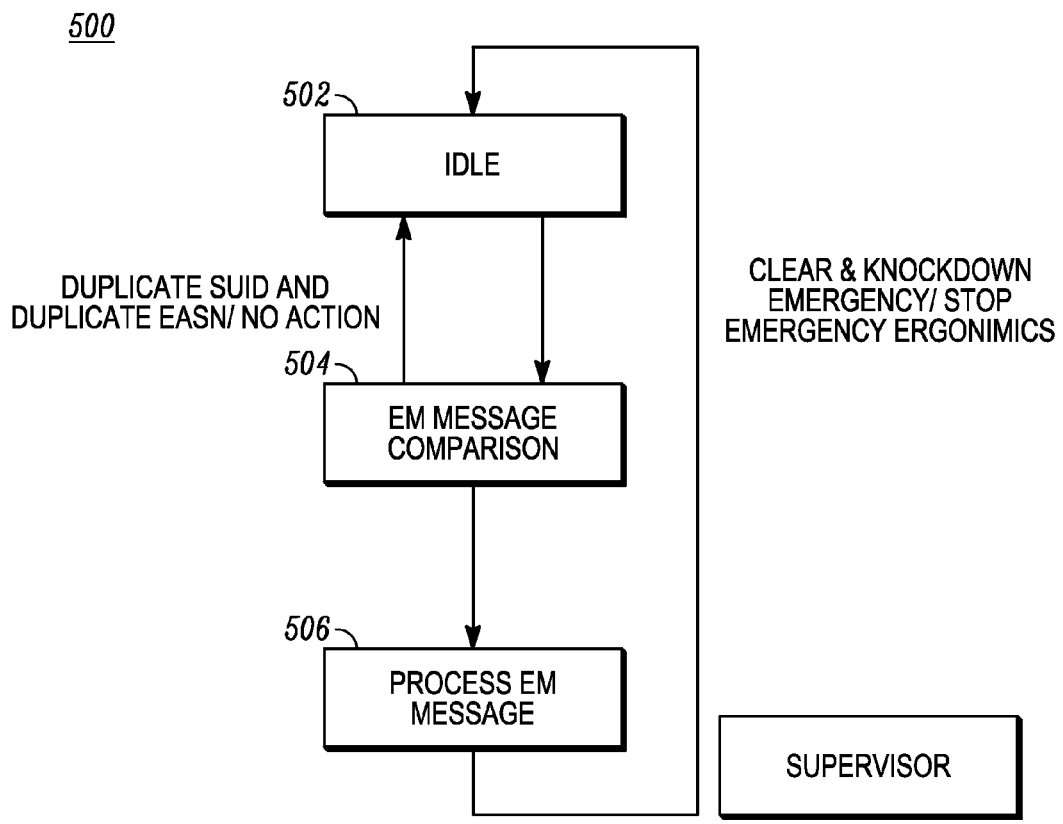
FIG. 5 is a state diagram of an example emergency supervisor in accordance with an embodiment of the invention.

Referring to FIG. 5, shown is a state diagram of the operation of an EM responder and/or and EM monitor 500 ("collectively termed an "EM supervisor"), e.g. EM responder 104 and/or EM monitor 106. An EM supervisor normally is in an idle state 502 where the EM supervisor 502 waits until an EM message is received. If the EM supervisor is an EM responder, the EM supervisor will send an acknowledgement message to the EM initiator and may wait a random launch time (as described above). In any case, the EM supervisor will enter a comparison EM state 504, where the EM supervisor will compare the received EM message with a list of EM messages (as described above). If the received EM message is a duplicate EM message, namely a received EM message with SUID and EASN that are the same as a previously received EM message, then the duplicate EM message is ignored.

As described above, if the EM initiator resends the EM message, an EM supervisor may receive the EM message a number of times. To distinguish duplicate EM messages (e.g. duplicate attempts of the same EM message) from new EM messages, a sequence number easily distinguishes the two. That is, a new sequence number is used for new EM messages and the same sequence number is used for duplicate EM messages. Thus, an EM supervisor that has received a duplicate EM message may easily identify that the EM message is a duplicate by noting that the sequence number is the same as previously received in a previous EM message and ignore it. For example, an EM supervisor that receives an EM message that has been transmitted 10 times does not indicate to the user on its display and/or audibly indicate the received duplicate EM messages.

If the EM message is not a duplicate, that is the EM message has either a new source address or it has a new sequence number, then the EM supervisor 500 transitions to a process EM message state 506 where the EM supervisor indicates the EM message to a user of the subscriber. Further, the EM supervisor may move the EM message to the top of the list and may remove other instances of EM messages from the same source address. In any case, once the user of the EM supervisor 500 clears the EM message from the display, the EM supervisor 500 transitions to the idle state 502.

At the highest level, an embodiment of the present invention provides management of emergency alarm messages when an EM initiator sends an EM message to another subscriber in the wireless communications system 100 where the management is provided by the subscribers without the aid of supporting equipment. As such, the subscribers in the wireless communications system handle the initiating of emergency alarm messages, handle the acknowledgements to the emergency messages, and process any resending of the emergency messages and/or acknowledgements.

As is known to one of ordinary skill in the art, a subscriber preferably comprises at least one of a mobile or portable device (such as an in-car or handheld radio or radio telephone) capable of communicating with another subscriber. In one embodiment, each of the subscribers communicate using time division multiple access (TDMA) or time division duplex (TDD) techniques as is known to one of ordinary skill in the art, in which specified time segments are divided into assigned time slots for individual communication. As is known in the art, each RF frequency in the wireless communications system 100 carries time slots whereby each time slot is known as a "channel." Thus, for the subscribers shown in FIG. 1, each subscriber has two channels.

In an illustrative embodiment of the present invention, the wireless communications system 100 assumes a two slot TDMA communications system; however, other slotting ratios may be used in the TDMA communications system and still remain within the spirit and scope of the present invention. Further, the wireless communications system 100 may be an analog communications system or a digital frequency division multiple access (FDMA) system. Thus, the wireless communications system 100 is not limited to digital TDMA communications systems.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A system for managing emergency alarm messages in a wireless communications system comprising a plurality of subscriber endpoints, the system comprising:

a first subscriber endpoint that is assigned an emergency alarm responder role prior to an emergency alarm message being generated by an initiating subscriber endpoint, wherein in response to having the emergency alarm responder role and in response to receiving the emergency alarm message at a group address from the initiating endpoint, the first subscriber a) sends an acknowledgement message to the initiating subscriber and b) presents information from the emergency alarm message to a user of the first subscriber; and a second subscriber endpoint that is assigned an emergency alarm monitor role prior to the emergency alarm message being generated by the initiating subscriber, wherein in response to having the emergency alarm monitor role and in response to receiving the emergency alarm message at the group address from the initiating subscriber, the second subscriber presents information from the emergency alarm message at the group address from the initiating subscriber, the second subscriber presents information from the emergency alarm message to a user of the second subscriber without sending an acknowledgement to the initiating subscriber, wherein the emergency alarm message is sent without supporting equipment.

2. The system of claim 1 wherein the emergency alarm message comprises at least one of a sequence number, a source address, a responder level, a retry number, and the group address.

3. The system of claim 1 wherein the emergency alarm message comprises a sequence number, and wherein the sequence number is not cleared upon a power cycle of the initiating subscriber.

4. The system of claim 1 wherein the information is presented if the emergency alarm message is not a duplicate.

5. A method of managing emergency alarm messages in a wireless communications system comprising a plurality of subscriber endpoints, the method comprising the steps of:

at a first subscriber endpoint that is provisioned to have an emergency responder role or an emergency monitor role prior to an emergency alarm message being generated by a second subscriber endpoint in the wireless communication system:

receiving the emergency alarm message at a group address from the second subscriber, wherein the emergency alarm message is sent without supporting equipment; presenting information to a user of the first subscriber endpoint relating to the emergency alarm message; and sending an acknowledgement message to the second subscriber only when the first subscriber endpoint is provisioned to have the emergency responder role.

6. The method of claim 5 wherein the step of sending further comprises waiting a random launch time before sending an acknowledgment.

7. The method of claim 5 wherein the emergency alarm message comprises at least one of source address of the emergency alarm message, a sequence number, an EM responder level, a group address, and a retry number.

8. The method of claim 5 wherein information is presented if the emergency alarm message is not a duplicate.

9. The method of claim 5 wherein the information is at least one of a) displayed to a user of the first subscriber and b) audibly indicated to a user of the first subscriber.

10. The method of claim 5 wherein an audible indicator is stopped when the user clears the emergency alarm message from a display of the first subscriber endpoint.

11. A method of managing emergency alarm messages in a wireless communications system comprising a plurality of subscriber endpoints, the method comprising the steps of:

at a first subscriber endpoint of the plurality of subscriber endpoints in the wireless communications system:

generating and sending an emergency alarm message to each of the remainder of the plurality of subscriber endpoints in the wireless communications system using a group address, wherein the emergency alarm message is sent without the use of supporting equipment, wherein the emergency alarm message is sent to at least a second subscriber endpoint in the plurality having an emergency responder role or to a third subscriber endpoint in the plurality having an emergency monitor role, wherein the roles are assigned prior to the emergency alarm message being generated by the first subscriber endpoint; and receiving an acknowledgement message from the second subscriber endpoint of the plurality of subscriber endpoints.

12. The method of claim 11 wherein the emergency alarm message indicates a sequence number so that each of the remainder of the plurality of subscriber endpoints may identify duplicate emergency alarm messages.

13. The system of claim 12 wherein the first subscriber endpoint does not clear a sequence number upon a power cycle.

14. The method of claim 11 further comprising the first subscriber endpoint resending an emergency alarm message wherein the emergency alarm message indicates an emergency responder level for at least one of the remainder of the plurality of subscriber endpoints, when an acknowledgement message is not received.

15. The method of claim 14 wherein the step of resending is performed a number of times for each emergency responder level wherein a retry number is specified in the emergency alarm message.

* * * * *